US008996235B2

United States Patent
Singh et al.

(10) Patent No.: US 8,996,235 B2
(45) Date of Patent: Mar. 31, 2015

(54) REPAIR ASSIST SYSTEM FOR VEHICLE SERVICING

(75) Inventors: Satnam Singh, Bangalore (IN); Steven W. Holland, Saint Clair, MI (US); Pulak Bandyopadhyay, Rochester Hills, MI (US); Pattada A. Kallappa, Karnataka (IN); Robert J. Casper, Canton, MI (US); Jeremy Krall, Dearborn Heights, MI (US); Joseph M. Martinez, Howell, MI (US); Brian W. Quinn, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 531 days.

(21) Appl. No.: 13/295,170

(22) Filed: Nov. 14, 2011

(65) Prior Publication Data
US 2013/0124032 A1   May 16, 2013

(51) Int. Cl.
*G06F 7/00* (2006.01)
*G05B 23/02* (2006.01)

(52) U.S. Cl.
CPC ............................. *G05B 23/0278* (2013.01)
USPC .................... 701/29.4; 701/29.1; 701/31.4

(58) Field of Classification Search
None
See application file for complete search history.

(56) References Cited

U.S. PATENT DOCUMENTS

| | | | | |
|---|---|---|---|---|
| 5,729,452 A * | 3/1998 | Smith et al. | | 701/31.9 |
| 6,263,322 B1 * | 7/2001 | Kirkevold et al. | | 705/400 |
| 6,314,422 B1 * | 11/2001 | Barker et al. | | 715/205 |
| 7,142,959 B2 * | 11/2006 | Oesterling et al. | | 701/32.4 |
| 7,272,475 B2 * | 9/2007 | Gawlik et al. | | 701/31.5 |
| 8,463,485 B2 * | 6/2013 | Howell et al. | | 701/29.4 |
| 2002/0007237 A1 * | 1/2002 | Phung et al. | | 701/33 |
| 2002/0016655 A1 * | 2/2002 | Joao | | 701/35 |
| 2004/0199542 A1 * | 10/2004 | Morgan et al. | | 707/104.1 |
| 2005/0251304 A1 * | 11/2005 | Cancellara et al. | | 701/33 |
| 2012/0041638 A1 * | 2/2012 | Johnson et al. | | 701/33.1 |
| 2012/0116630 A1 * | 5/2012 | Howell et al. | | 701/29.4 |
| 2014/0032422 A1 * | 1/2014 | Jones | | 705/304 |

FOREIGN PATENT DOCUMENTS

DE    195 23 483 C2    1/1997
DE    10 2004 052 780 B4    4/2006

* cited by examiner

*Primary Examiner* — Mussa A Shaawat

(57) ABSTRACT

A vehicle repair assist system for repairing a vehicle fault in a vehicle. A symptom input module is provided for entering vehicle symptom information relating to the fault. A diagnostic code module retrieves diagnostic trouble codes from the vehicle. The diagnostic trouble codes are generated in response to a fault occurrence. A knowledge-based fault module identifies potential causes of the vehicle fault based on at least one of the symptom information and diagnostic trouble codes. A repair assistant module identifies recommended repair parts and repair procedures for repairing the cause of the vehicle fault. The repair assistant module communicates with the knowledge-based fault module for obtaining a prioritized listing of the recommended repair parts and repair procedures for repairing the vehicle fault.

20 Claims, 2 Drawing Sheets

REPAIR ASSIST SYSTEM FOR VEHICLE SERVICING

BACKGROUND OF INVENTION

An embodiment relates generally to a service repair assistant system.

Vehicle repairs are conducted at vehicle repair stations by trained service technicians. Vehicle repairs are also often performed by owners or users of the vehicles. Both the service technicians as well as users utilize service procedures or manuals that inform the service technicians on the service steps in an attempt to identify a root cause of the fault and repair the fault. Service manuals are typically generated well in advance of the vehicle production and include step by step procedures for repairing the vehicle. Service manuals are utilized by both the service technician and users. However, during a life of the vehicle, repair procedures as well as diagnosis procedures are updated. The evolution of detecting faults and their root causes is an ongoing process that continues through warranty and engineering analysis in addition to service technician feedback after repairing vehicles. Moreover, despite the service manuals being somewhat comprehensive, the service procedures within the manuals are usually generic and place the onus on the service technician to interpret the diagnostic steps, gather and integrate symptoms, identify the root cause, and make the necessary repair. Chances for misinterpreting steps or skipping cross-system dependency tests are likely due to time constraints, costs, and the service technician thinking they can diagnose and repair the faults without fully analyzing the symptoms.

Oftentimes a user desires to repair a vehicle on their own, particularly when the vehicle is out of the warranty period and expenses must be incurred on by user. However, the user may not have expertise in diagnosing the problem, or an understanding how to correct the problem, or may have outdated service manuals.

A service technician, with detailed experience and knowledge of vehicles may utilize their background knowledge for diagnosing the problem. The drawback of this is that a technician may skip a recommended test that involves a less obvious repair and instead choose to replace a more conspicuous component, only to find out that the more conspicuous component did not correct the problem. Replacement of such a component, if it was incorrectly diagnosed as being the root cause the fault results in added expense for the original manufacturer by having to cover the cost of the incorrect repair.

What would be helpful is a system that not only allows users to understand the problem and the details of the repair associated with the problem, but also a system that diagnoses the root cause of the problem and put checks in place so that inappropriate repairs are not made on the vehicle.

SUMMARY OF INVENTION

An advantage of an embodiment is a system that requires authorization for certain parts to be replaced on a vehicle prior to a technician actually performing the repair. The system analyzes symptoms, codes, and failure modes for diagnosing potential root causes of the vehicle for generating a prioritized list of repairs that are made to the vehicle. The system safeguards against replacement of restricted components by requiring that an orderly and sequential testing and repairs are exhausted. Another advantage of the invention is a system that provides users with detailed information relating to the potential root causes of the problem and provides additional details that allow the user to make an informed decision as to whether the user wants to self-repair the vehicle.

An embodiment contemplates a method of providing assistance for repairing a vehicle fault in a vehicle. A repair assistant module receives vehicle symptom information relating to the vehicle fault. The repair assistant module receives diagnostic trouble codes from the vehicle. The diagnostic trouble codes are generated in response to a vehicle fault occurrence. Potential causes of the vehicle fault are identified by a knowledge-based fault module. The potential causes are identified based on at least one of the vehicle symptom information and diagnostic trouble codes. The repair assistant module communicates the potential causes to the repair assistant module. Recommended repair parts and repair procedures are identified by the repair assistant module for repairing the vehicle fault. The repair assistant module outputs a prioritized listing of the recommended repair parts and repair procedures for repairing the vehicle fault.

An embodiment contemplates a vehicle repair assist system for repairing a vehicle fault in a vehicle. A symptom input module is provided for entering vehicle symptom information relating to the fault. A diagnostic code module retrieves diagnostic trouble codes from the vehicle. The diagnostic trouble codes are generated in response to a fault occurrence. A knowledge-based fault module identifies potential causes of the vehicle fault based on at least one of the symptom information and diagnostic trouble codes. A repair assistant module identifies recommended repair parts and repair procedures for repairing the cause of the vehicle fault. The repair assistant module communicates with the knowledge-based fault module for obtaining a prioritized listing of the recommended repair parts and repair procedures for repairing the vehicle fault.

DETAILED DESCRIPTION

Figure 1:
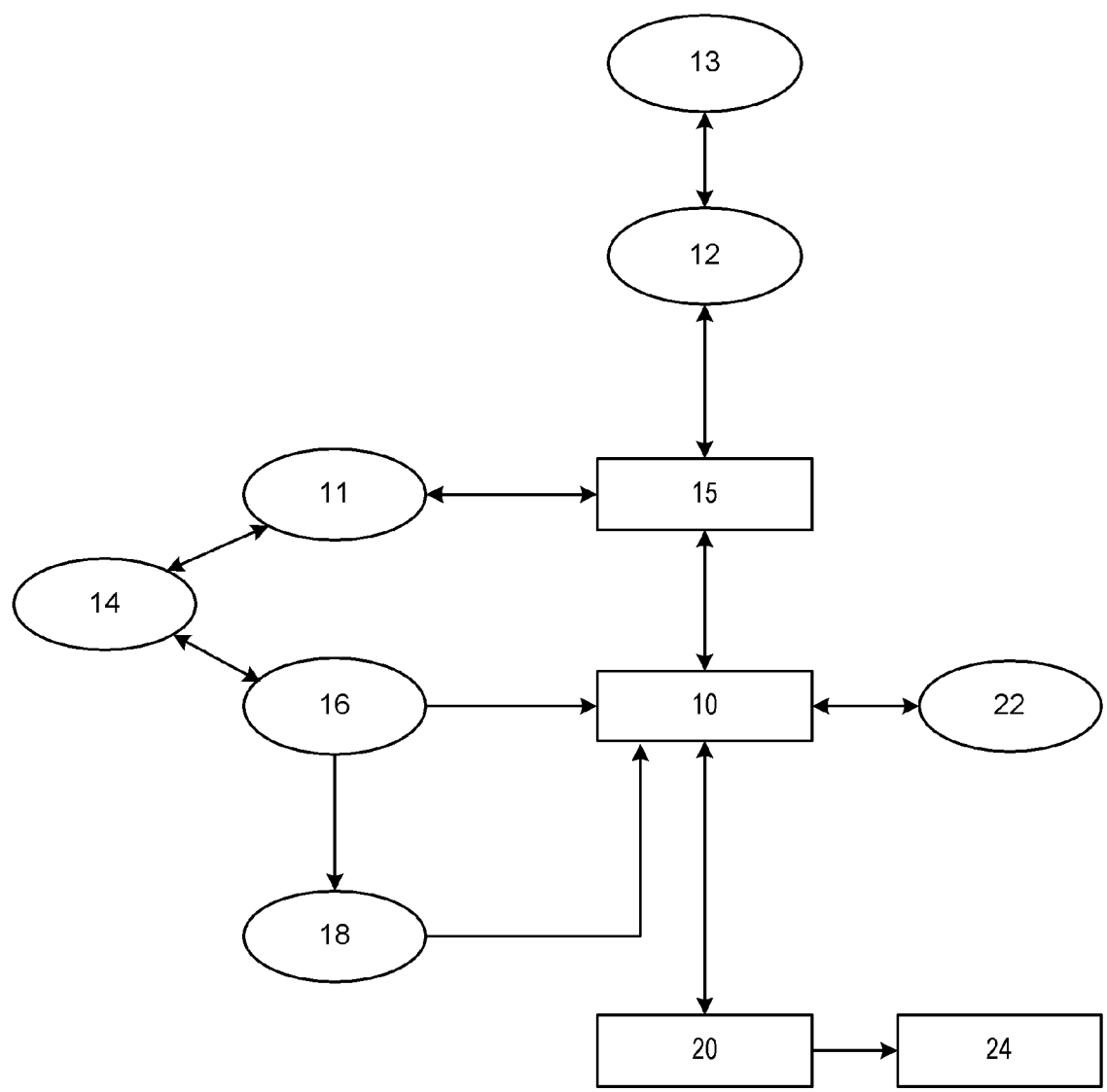
FIG. 1 is a block diagram of the vehicle repair assist system.

There is show generally in FIG. 1 a vehicle repair assist system. A repair assistant module 10 is in communication with a service center 11 repairing the vehicle and/or a web-based portal 12 used by a user 13 for self-repairing the vehicle.

The service center 11 may include a service department at a dealership. A service personnel, such as a service technician 14, at the service center 11 attempts to diagnose a root cause of the problem of the vehicle based on the reported problem by the customer or by other tests performed on the vehicle. The reported problem may include the symptoms exhibited by the vehicle. The symptom may be communicated to the service technician 14 by the user 13 or the service technician 14 may test drive the vehicle and experience the symptoms. Such symptoms include faults the vehicle is experiencing and customer complaints relating to problems that the customer experienced with the vehicle.

Customer complaints may include message warnings observed by the user 13 while operating the vehicle, descriptions of the problem experienced while operating the vehicle, or descriptions of the operation of the vehicle that are different than the norm or what the user 13 has been accustomed to while operating the vehicle.

Tests by the service technician 14 may also be performed on the vehicle for determining what the operating conditions of the vehicle are when the symptoms are exhibited. Test results output from the test may include any test data derived by a diagnostic device (e.g., diagnostic scan tool, diagnostic analyzer, tester, multi-meter, etc.) The service technician 14 may enter the test results and the symptom information experienced by both the service technician 14 and the user 13 into a symptom input module 15 which is in communication with the repair assistant module 10. The symptom input module 15 may include a software program which receives information entered by the service technician 14 and may communicate with the repair assistant module 10 for determining potential faults and repairs.

Moreover, the service technician 14 may also identify the potential issue through diagnostic trouble codes (DTCs). The service technician 14 will run a diagnostic check on the vehicle using a diagnostic code module 16, such as a scan tool, that communicates with one or more processors in the vehicle (e.g. engine control module). Each of the processors in the vehicle includes a memory or utilizes a remote memory for storing DTCs when the vehicle experiences a problem and an error code is recorded. Storing the DTCs in the vehicle processor memory alleviates the service technician 14 of trying to recapture the problem with the vehicle, particularly if the vehicle is not currently symptomatic of the problem; rather, the service technician 14 can review the current or past history of any DTCs that have been stored in the memory of the vehicle for determining what issues were present with the vehicle when the problem occurred. DTCs may be related to various vehicle functions that include, but are not limited to, engine operation, emissions, braking, powertrain, and steering. Each subsystem may have its own on-board processor for monitoring faults of the subsystem operation or a processor may be responsible for monitoring faults for a plurality of subsystems. When the subsystem processor detects a fault, one or more DTCs are generated. The DTCs are stored in the processor's memory and are later retrieved by the service technician 14 when tested. The DTCs assist the service technician 14 in pinpointing the area of concern.

The scan tool may also be used to retrieve the operating parameter identifiers (PIDs) which are recorded at the time a DTC is triggered and recorded by the on-board processors. The health of the subsystems is typically monitored by a plurality (e.g., thousands) of operating PIDs which is continuously collected using various sensors and diagnostic software routines contained in the on-board processors. The DTCs and PIDs are provided to the repair assistant module 10 for analyzing and diagnosing the problem. Such data may be entered directly to the repair assistant module 10 via the symptom input module 15 or may be entered via another communication medium.

A user 13 that is self-repairing the vehicle may access the symptom input module 15 via the web-based portal 12 for entering details of the symptoms experienced with the vehicle fault. The web-based portal 12 may include a computer or other device having web-based access with the repair assistant module 10. The symptom input module 15 may include a software program which provides access through the web-based portal 12 for entering the symptoms. The repair assistant module 10 may also be accessed utilizing an in-vehicle telematics service 18. This telematics service 18 is used to provide in-vehicle security, remote diagnostics systems, and turn-by-turn navigation through a wireless communication system. Information obtained by the telematics service 18 relating to the fault (e.g., DTCs and other fault codes) may be communicated directly to the repair assistant module 10 by the telematics service 18. DTCs triggered and recorded by the vehicle are automatically monitored by the telematics service 18.

The repair assistant module 10 is in communication with a knowledge-based fault module 20. The knowledge-based fault module 20 may include a failure mode-symptom matrix and diagnostic reasoner. The failure mode-symptom matrix (e.g., fault model or dependency matrix) is described in co-pending application Ser. No. 12/630,866 filed Dec. 4, 2009, the subject matter which is incorporated by reference. The failure mode-symptom matrix correlates failure modes with symptoms. Symptoms may include DTCs, PIDs based symptoms, customer complaints, technician test outcomes, and scan tool data. The diagnostic reasoner with the aide of the failure mode-symptom matrix determines what recommended repair should be used to repair the equipment based on the reported symptoms.

The symptoms may include DTCs, customer complaints, operating parameters, and test results that are obtained by the service technician 14 to analyze the problem or a user self-entering the data. It should be understood that the user 13 may not have access to a scan tool for retrieving DTC codes and other vehicle operating parameter data; however, if the vehicle is equipped with the in-vehicle telematics service 18, such data may be autonomously obtained from the vehicle.

After the potential causes and recommended repairs are identified, the repair assistant module 10 generates a prioritized list of repairs that are recommended for correcting the faults with the vehicle. The recommended repair may be a single repair or a plurality of repairs that are sequentially listed if the exact issue cannot be isolated. Moreover, repair assistant module 10 may provide further instructions for requiring additional testing and data collection if the exact issue is not easily ascertainable from the current set of data so that the cause of the fault can be more readily isolated and identified. The repair assistant module 10 attempts to guide the technician 14 or user 13 in making only those repairs by eliminating unwarranted repairs. The repair assistant module 10 communicates with the service center 11 in real-time so that diagnosis and repairs may be immediately performed on the vehicle. A prioritized list of repairs may be made available to the service center 11 from the repair assistant module 10. The prioritized list may include a prioritized list of repairs to be performed, a prioritized list of failure modes, and as well as suggested tests by the technician.

When repairing the vehicle at a service center 11, the vehicle may still be under the manufacturers warranty such that cost of parts and labor for the repair are covered by the manufacturer. In such cases, manufactures may place restriction on part replacement. This is done so that unnecessary expenses are not incurred for components that are expensive, or are likely to be replaced when those respective components are not the root cause of the problem. In such instances, if a component or repair is under restriction, then the repair assistant module 10 will autonomously determine whether authorization should be provided for using the restricted component. That is, restricted component relates to a repair that requires authorization prior to performing the vehicle repair utilizing the restricted component. The authorization for going forward with the repair is communicated to the service center 11 by providing a unique code or authorization number automatically provided by the repair assistant module 10. The unique code or authorization number allows the service center 11 to charge the manufacturer for reimbursement of the expenses incurred with the repair to the restricted component (e.g., warranty). This process ensures that the more likely and possibly less expensive repair alternatives are considered first prior to replacing the restricted component. That is, the process deters a service center 11 from first making inappropriate repairs utilizing the restricted component when such a repair may not be the corrective repair that is needed. Moreover, the potential causes as identified by the knowledge-based fault module 20 may not be a comprehensive list of known faults. A key motivation for the automation or semi-automation of handling of service parts restrictions is that a manual authorization process would be very burdensome in terms of time and cost for both the service technician and the service center. While parts restriction may be a very effective process for minimizing certain unnecessary and costly repairs, a considerable amount of time may be consumed for the technician awaiting an approval by a person manually approving the use of a component. Further, it can result in tying up a service bay for an extended period of time while awaiting authorization to proceed. During that time, it becomes expensive to have a service bay essentially offline where it can no longer be used to solve other customer's problems awaiting service or be utilized to repair other vehicles thereby costing the service center potential revenue.

The repair assistant module 10 may also be in communication with a technical assistance advisor 22. The technical assistant advisor 22 or other personnel at a technical assistance center is typically a subject matter expert or group of subject matter experts having expert domain knowledge of the equipment and knowledge of the faults that occur with the vehicle. The technical assistant advisor 22 may include engineers, technical experts, service and maintenance personnel, statisticians, and any other person having an in-depth knowledge of the equipment or the operation of the equipment. Failure modes of the vehicle are collectively maintained based on engineering knowledge, best practices, and past experiences of the subject matter experts and may be may be added to the knowledge-based fault module 20. The technical assistant advisor 22 is contacted in the event the knowledge-based fault module 20 is unable to able to identify or narrow down the root cause of the fault.

For the user 13 that is self-repairing a vehicle, the user 13 will communicate with the repair assistant module 10 via the web-based portal 12 or through an in-vehicle diagnostic interface (e.g., the telematics service) or other communication link. By utilizing the symptoms entered by the user 13 and possibly DTCs obtained through the in-vehicle diagnostic interface, the repair assistant module 10 generates the potential causes of the vehicle fault and the recommended repairs. Recommendations by the repair assistant module 10 may include, but are not limited to, estimated cost of repair, estimated time for the repair, severity of the fault, root causes of the fault, degree of proficiency required to perform the repair, need for special tools, probability of repairing the problem, combinations of repairs to be considered simultaneously to maximize success of the repair, location of parts required for repair, new or available reconditioned parts, and price quoting. The repair assistant module 10 utilizes a communication medium 24 for providing the information to the user. The communication medium 24 may include, but is not limited to the web-based portal or electronic mail.

Information relating to the repair, including but not limited to data, technician comments, and customer complaints may be stored in a memory and provided to the repair assistant module 10. The received information may be analyzed and implemented in the knowledge-based fault module 20 for refining the correlation symptoms and failure modes. It should be understood that the repair assistant module 10 is adaptive and gets updates based on knowledge from other sources that include, but are not limited to, fleet-wide data and experts auditing and inputting the knowledge information. As a result, the repair assistant module 10 provides a process to learn from other service centers because the fleet-wide knowledge is captured and incorporated in the knowledge base failure mode-symptom matrix. In addition, the details of the technician test outcomes that get recorded through the repair assistant module 10 provide an avenue for generating feedback to engineering designers and developers.

Figure 2:
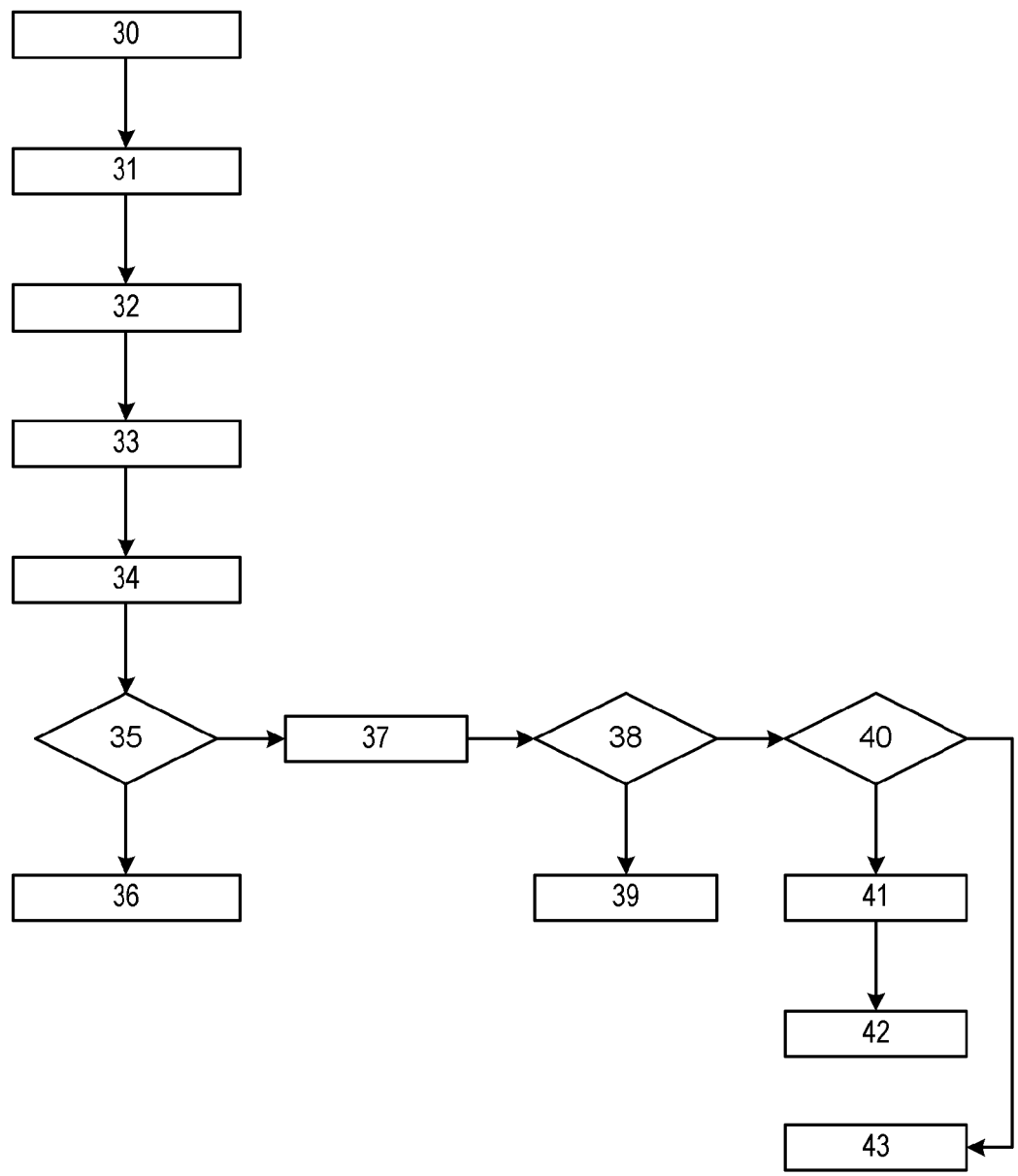
FIG. 2 is a flowchart of a method for providing assistance for performing a vehicle repair.

FIG. 2 illustrates a method for providing assistance for performing a vehicle repair.

In step 30, information relating to the vehicle fault is reported into the vehicle repair assist system. The information may include a user's comments as it relates to the problem experienced from the vehicle.

In step 31, DTC codes, including PIDs, are reported into the vehicle repair assist system. The DTC and PID codes are obtained utilizing a scan tool operated by the service technician or obtained by the in-vehicle diagnostic interface (e.g., the telematics service).

In step 32, the technician's comments, including any test results, are reported into the vehicle repair assist system.

In step 33, the information collected in steps 30-32 are provided to the repair assistant module. The repair assistant module organizes the data for analyzing and diagnosing the vehicle fault.

In step 34, the repair assistant module communicates the information to the knowledge-based fault module wherein potential causes are identified based on a correlation between the reported symptoms and codes.

In step 35, a determination is made whether the repair is a warranty repair or a non-warranty repair. If the repair is not a warranty repair, then the routine proceeds to step 36. If the repair is a warranty repair, then the routine proceeds to step 37.

In step 36, in response to the potential repairs not being under warranty, as determined in step 35, the repair assistant module outputs self repair information for repairing the vehicle. The information provided from the repair assistant module may include, but is not limited to, estimated cost of repair, estimated time for the repair, severity of the fault, root causes of the fault, degree of proficiency required to perform the repair, need for special tools, probability of repairing the problem, combinations of repairs to be considered simultaneously to maximize success of the repair, location of parts require for repair, new or available reconditioned parts, and price quoting. The information provided in step 36, is primarily for those users that are self-repairing a vehicle. However, a service center that has been solicited to diagnose the problem for the user may utilize this information and provide it to the user so that the user may make an informed decision of whether to have the service center complete the repairs or whether the user will self repair the vehicle.

In step 37, the recommended potential faults and recommended repairs are communicated to the repair assistant module.

In step 38, a determination is made whether any of the recommended repairs utilize a restricted component. If the repairs do not utilize a restricted component, then the routine proceeds to step 39. If the repairs utilize a restricted component, then the routine proceeds to step 40.

In step 39, in response to none of the recommended repairs involving a restricted component, as determined in step 38, the repair assistant module outputs the potential causes and associated repairs to be performed on the vehicle. The repair assistant module may identify a prioritized listing of the repairs to be made as well as a prioritized listing of the potential causes of the vehicle fault.

In step 40, authorization for performing the repair utilizing the restricted component is autonomously determined by the repair assistant module. If the repair assistant module authorizes the repair, then the routine proceeds to step 41, otherwise the routine proceeds to step 43.

In step 41, an authorization code is provided to the service technician for authorizing the repair and use of the restricted component.

In step 42, the service technician performs the repair utilizing the restricted component. The authorization code is provided to the original manufacturer identifying that the repair performed by the service technician was authorized by the manufacturer and the costs for the repair may be recovered from the manufacturer.

In step 43, in response to the repair assistant module not authorizing the repair utilizing the restricted component, the repair assistant module provides recommendations for additional testing or alternative repairs that are performed on the vehicle.

While certain embodiments of the present invention have been described in detail, those familiar with the art to which this invention relates will recognize various alternative designs and embodiments for practicing the invention as defined by the following claims.

What is claimed is:

1. A vehicle repair assist system for repairing a vehicle fault in a vehicle comprising:
    a symptom input module for entering vehicle symptom information relating to the fault;
    a diagnostic code module for retrieving diagnostic trouble codes from the vehicle, the diagnostic trouble codes being generated in response to a fault occurrence;
    a knowledge-based fault module for identifying potential causes of the vehicle fault based on at least one of the symptom information and diagnostic trouble codes; and
    a repair assistant module for identifying recommended repair parts and repair procedures for repairing the cause of the vehicle fault, the repair assistant module communicating with the knowledge-based fault module for obtaining a prioritized listing of the recommended repair parts and repair procedures for repairing the vehicle fault.

2. The vehicle repair assist system of claim 1 wherein the repair assistant module autonomously determines whether authorization should be provided for using a restricted component, wherein the restricted component relates to a repair that requires authorization prior to performing the vehicle repair utilizing the restricted component.

3. The vehicle repair assist system of claim 2 wherein the repair assistant module provides the authorization in real time.

4. The vehicle repair assist system of claim 1 wherein the symptom information relating to the vehicle fault includes a customer description of the vehicle fault.

5. The vehicle repair assist system of claim 1 wherein the symptom information relating to the fault includes service technician test data relating to the vehicle fault.

6. The vehicle repair assist system of claim 1 wherein the repair assistant module is in communication with a user of the vehicle, wherein the user obtains self-repair information from the repair assistant module for identifying and repairing the potential causes of the vehicle fault.

7. The vehicle repair assist system of claim 1 wherein the user communicates with the repair assistant module through a web-based portal.

8. The vehicle repair assist system of claim 1 wherein the user communicates with the repair assistant module through an in-vehicle communication system.

9. The vehicle repair assist system of claim 1 wherein the repair assistant module communicates a repair procedure to the user, communicates to the user an approximate cost associated with the procedure, and communicates to the user an estimated time to repair the vehicle fault.

10. The vehicle repair assist system of claim 1 further comprising a technical assistant advisor, wherein input from the technical assistant advisor is used in cooperation with the repair assistant module for diagnosing the vehicle fault.

11. A method of providing assistance for repairing a vehicle fault in a vehicle, the method comprising the steps of:
    a repair assistant module receiving vehicle symptom information relating to the vehicle fault;
    the repair assistant module receiving diagnostic trouble codes from the vehicle, the diagnostic trouble codes being generated in response to a vehicle fault occurrence;
    identifying potential causes of the vehicle fault by a knowledge-based fault module wherein the potential causes are identified based on at least one of the vehicle symptom information and diagnostic trouble codes;
    wherein the knowledge-based fault module communicates the potential causes to the repair assistant module, wherein recommended repair parts and repair procedures are identified by the repair assistant module for repairing the vehicle fault based on the identified potential causes, and wherein the repair assistant module outputs a prioritized listing of the recommended repair parts and repair procedures for repairing the vehicle fault.

12. The method of claim 11 wherein the repair assistant module autonomously determines whether authorization should be provided for using a restricted component, wherein the restricted component relates to a repair that requires authorization prior to performing the vehicle repair utilizing the restricted component.

13. The method of claim 12 wherein the repair assistant module provides authorization of the vehicle repair in real time.

14. The method of claim 12 wherein a customer description of the vehicle fault is communicated to the repair assistant module as part of the symptom information.

15. The method of claim 12 wherein service technician test data relating to the vehicle fault is communicated to the repair assistant module as part of the symptom information.

16. The method of claim 11 further comprising the step of communicating from the repair assistant module to the user self-repair information for repairing the vehicle fault.

17. The method of claim 11 wherein the self-repair information includes a repair procedure, an approximate cost associated with the procedure, and an estimated time to repair the vehicle fault.

18. The method of claim 11 wherein the user communicates with the repair assistant module through a web-based portal.

19. The method of claim 11 wherein the user communicates with the repair assistant module through an in-vehicle communication system.

20. The method of claim 11 further comprising a technical assistant advisor, wherein input from the technical assistant advisor is used in cooperation with the repair assistant module for diagnosing the vehicle fault.

* * * * *